(12) United States Patent
Jørgensen et al.

(10) Patent No.: US 6,810,749 B2
(45) Date of Patent: Nov. 2, 2004

(54) FIBRE-OPTICAL STRAIN GAUGE AND METHOD FOR THE PRODUCTION OF SAID STRAIN GAUGE

(75) Inventors: Henrik Skårup Jørgensen, Skjern (DK); Benny Aaris Klemar, Viby J (DK); Jesper Jensen, Århus N (DK)

(73) Assignee: Vestas Wind Systems S/A, Ringkobing (DK)

( * ) Notice: Subject to any disclaimer, the term of this patent is extended or adjusted under 35 U.S.C. 154(b) by 0 days.

(21) Appl. No.: 10/451,239

(22) PCT Filed: Dec. 22, 2000

(86) PCT No.: PCT/DK00/00725
§ 371 (c)(1),
(2), (4) Date: Jun. 20, 2003

(87) PCT Pub. No.: WO02/052223
PCT Pub. Date: Jul. 4, 2002

(65) Prior Publication Data
US 2004/0035217 A1 Feb. 26, 2004

(51) Int. Cl.[7] .................................. G01L 1/24
(52) U.S. Cl. ........................................ 73/800
(58) Field of Search ................. 73/800, 862.324, 73/862.624

(56) References Cited

U.S. PATENT DOCUMENTS

| | | | | |
|---|---|---|---|---|
| 4,477,725 A | * | 10/1984 | Asawa et al. ........... | 250/227.16 |
| 5,402,231 A | * | 3/1995 | Udd .............. | 356/460 |
| 5,661,246 A | * | 8/1997 | Wanser et al. ................ | 73/800 |
| 5,841,131 A | * | 11/1998 | Schroeder et al. ..... | 250/227.17 |
| 6,173,091 B1 | * | 1/2001 | Reich ......................... | 385/12 |

* cited by examiner

Primary Examiner—Max Noori
(74) Attorney, Agent, or Firm—Stites & Harbison PLLC; Douglas E. Jackson

(57) ABSTRACT

The fibre-optical strain gauge comprises a mechanical construction (1) providing a strain-dependent relative movement of oppositely positioned, spaced apart first and second optical fibre ends in a direction substantially perpendicular to the axial direction of the optical fibres (7a, 7b) and uses the varying transmission of light between the two fibres (7a, 7b) as an indication of the strain. The mechanical construction comprises fibre-holding elements (6a, 6b) for securing the two fibres (7a, 7b) to the mechanical construction (1) in an aligned relationship in the unstrained condition. The mechanical construction (1) further comprises: a) anchorage means (3a, 3b) for providing two substantially pointy-formed connections between the mechanical construction (1) and the object to be measured on, a line (8) through said two connection points (3a, 3b) defining a strain-measuring direction; b) two connecting rods (2a, 2b), comprising articulated connections at both ends, to the respective anchorage means (3a, 3b) at one end and to respective further parts (5a–5d) of the mechanical construction at the other end, respectively, said two rods (2a, 2b) extending substantially in the strain-measuring direction (8); c) a transmission construction, connected articulated to the rod (2a, 2b) ends opposite the respective anchorage means (3a, 3b), for transferring the movement of said rods (2a, 2b) in said strain-measuring direction (8) to the fibre-holding elements (6a, 6b) and for guiding the movement of said fibre-holding elements (6a, 6b) in a direction substantially perpendicular to said axial direction of said optical fibres (7a, 7b). By this construction it is possible to obtein strain gauge measurments which are substantially not influenced by movements of the measuring points in a plane perpendicular to the desired strain measuring direction.

12 Claims, 3 Drawing Sheets

FIBRE-OPTICAL STRAIN GAUGE AND METHOD FOR THE PRODUCTION OF SAID STRAIN GAUGE This application is a 371 of PCT/DR00/00725 filed Dec. 22, 2000

TECHNICAL FIELD

The present invention relates to a fibre-optical strain gauge of the kind set forth in the preamble of claim 1.

BACKGROUND ART

In fibre-optical gauges of this kind it is known to incorporate a mechanical construction which provides a relative movement of oppositely positioned spaced apart first and second optical fibre ends in a direction substantially perpendicular to the axial direction of the optical fibres and using the varying transmission of light between the two fibres as an indication of the parameter to be measured. A fibre-optical gauge of this kind is known from U.S. Pat. No. 4,300,813 and although this document does not describe a strain gauge, the document is taken as a starting point for the present invention.

DISCLOSURE OF THE INVENTION

It is the object of the present invention to provide a fibre-optical strain gauge of the kind referred to above, with which it is possible to provide strain gauge measurements which are substantially not influenced by movements of the measuring points in directions in a plane perpendicular to the desired strain-measuring direction, and this object is achieved with a fibre-optical strain gauge of said kind, which according to the present invention also comprises the features set forth in the characterizing clause of claim 1. With this arrangement, said movements of the measuring points are eliminated to a large extent by means of the connecting rods comprising articulated connections at both ends, whereby such movements are substantially without influence on the further parts of the mechanical construction which transfers the movement of the measuring points in the strain-measuring direction to the fibre-holding elements. Preferred embodiments of the fibre-optical strain gauge, the advantages of which will be evident from the following description of preferred embodiments, are revealed in the sub-ordinate claims.

BRIEF DESCRIPTION OF THE DRAWINGS

In the following detailed part of the present description, the invention will be explained in more detail with reference to the exemplary embodiments of a fibre-optical strain gauge according to the invention shown in the drawings, in which FIG. 1 schematically shows the general principle in accordance with the present invention, FIGS. 2 and 2A schematically show the principle of the pantograph-like construction in accordance with a preferred embodiment of the present invention, FIG. 7 shows the bottom layer of a preferred embodiment in accordance with the present invention, comprising mounting means and glueing surface for connecting to the surface of the construction to be measured on.

DESCRIPTION OF THE PREFERRED EMBODIMENTS

Figure 1:
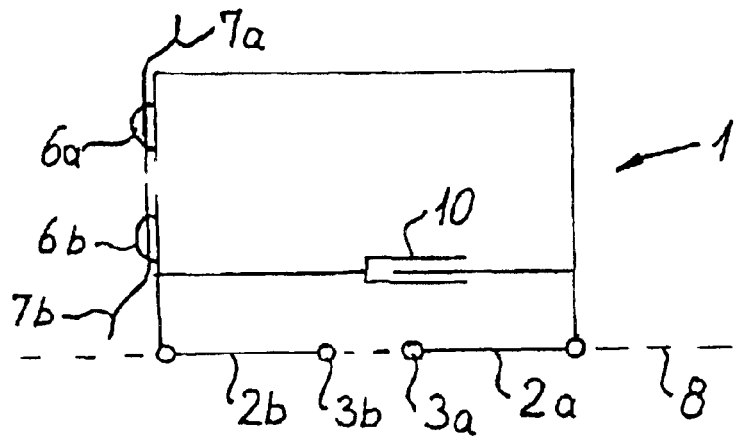

The mechanical construction 1, schematically shown in FIG. 1, includes two connecting rods 2a, 2b, comprising articulated connections to anchorage points 3a, 3b at one end and to further parts of the mechanical construction at the opposite ends. The further parts of the mechanical construction is schematically shown as rods connected to move the mounting means 6a, 6b for the optical fibres 7a, 7b mounted thereon. The mechanical construction further comprises guiding means 10 for guiding the movement of the mounting means 6a, 6b for the optical fibres 7a, 7b in a direction perpendicular to the axial direction of the optical fibres 7a, 7b. In this way, any relative movement of the anchorage points 3a, 3b, in a direction 8 along the line connecting the anchorage points 3a, 3b will be transferred to a corresponding movement of the mounting means 6a, 6b for the optical fibres 7a, 7b. Relative movements of the anchorage points 3a, 3b in a plane perpendicular to the strain-measuring direction 8 will substantially not influence the relative position of the mounting means 6a, 6b for the optical fibres 7a, 7b, due to the articulated connections at the ends of the connecting rods 2a, 2b.

It is to be understood that the relative movement of the mounting means 6a, 6b for the fibres 7a, 7b is of the same order of magnitude as the diameter of the optical fibres 7a, 7b. Accordingly, the relative movements of the anchorage points 3a, 3b is of the same order of magnitude both in the strain-measuring direction 8 and in the plane perpendicular to said strain-measuring direction, and accordingly, such movements in said plane will substantially not influence the relative positions of the mounting means 6a, 6b for the optical fibres 7a, 7b, due to the distance provided between the articulated connections at the opposite ends of the connecting rods 2a, 2b.

Figure 2:
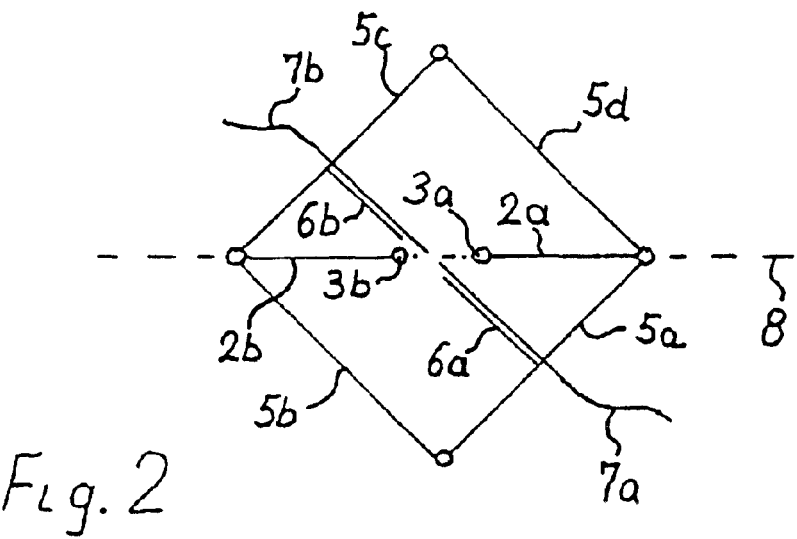
Figure 2A:
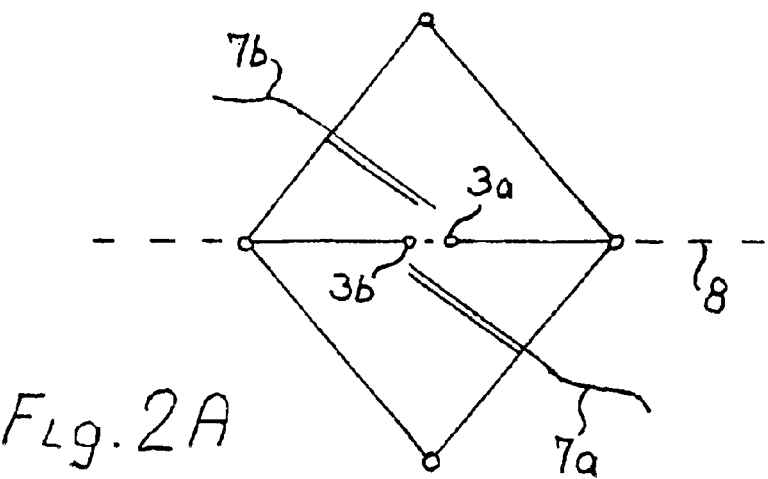

The mechanical construction 1 shown schematically in FIG. 2 comprises like the FIG. 1 construction, two connecting rods 2a, 2b, articulated connected at both ends and at one end being connected to anchorage points 3a, 3b and at the opposite end being connected to a pantograph-like mechanical construction for transferring the movements of the connecting rods 2a, 2b to the mounting means 6a, 6b for the optical fibres 7a, 7b. The pantograph-like mechanical construction comprises four rods 5a–5d mutually connected in a mainly square configuration with hinged connections at the corners. The mounting means 6a, 6b for the optical fibres 7a, 7b are mounted on oppositely positioned rods 5a, 5c. As shown schematically and greatly exaggerated in FIG. 2A, a relative movement of the anchorage points 3a, 3b towards one another provides a relative movement of the mounting means 6a, 6b for the optical fibres 7a, 7b in a direction perpendicular to the axial direction of the optical fibres 7a, 7b.

Figure 3:
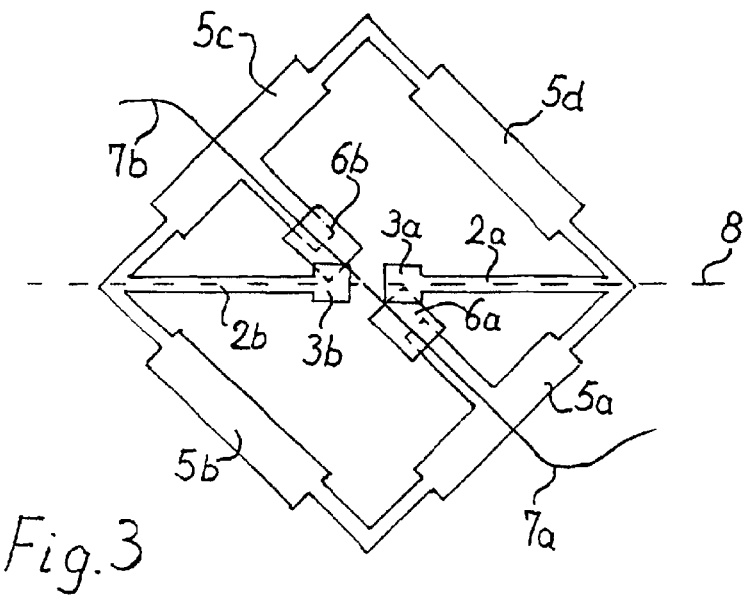
FIG. 3 shows a preferred embodiment corresponding to FIG. 2, produced in printed circuit board technology.

A mechanical construction functioning in accordance with the principles shown in FIG. 2 is shown in FIG. 3. This mechanical construction is produced in printed circuit board technology, taking advantage of the high precision production techniques developed for printed circuit boards. Other materials can naturally be used for this mechanical construction, such materials e.g. comprising metal, such as steel, plastic materials, such a acrylic, ceramic materials, etc.

Figure 4:
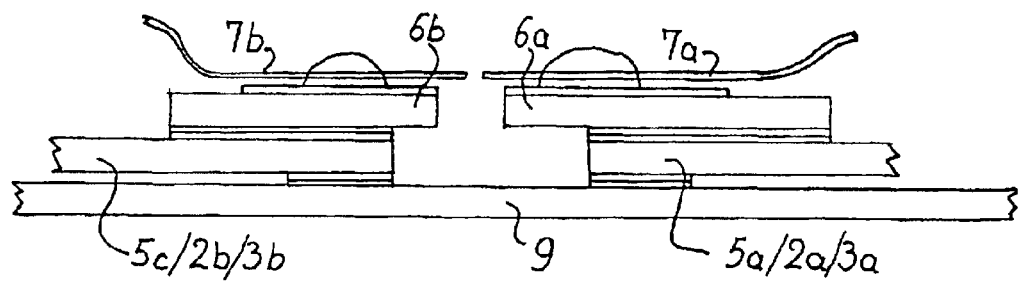
FIG. 4 shows the layered structure of the FIG. 3 embodiment.

In this construction, the hinged and articulated connections are provided in the form of parts of the mechanical construction with reduced cross-section. As shown in FIG. 4, the mechanical construction is a layered construction, in which the upper layer consists of the mounting means 6a, 6b for the optical fibres 7a, 7b. The optical fibres 7a, 7b can be mounted on the mounting means 6a, 6b by soldering or glueing. In a preferred embodiment, the optical fibres 7a, 7b are prestressed during the mounting of these on the mounting means and after solidification of the solder or hardening of the glue, the optical fibre is cleaved for providing the two optical fibres 7a, 7b mutually aligned and with a well-defined distance between the optical fibre ends, said distance being dependent on the pre-stressing during mounting. The mounting means 6a, 6b are mounted on an intermediate layer defining the mechanical construction which in the shown embodiment comprises the connecting rods 2a, 2b comprising articulated connections at both ends, one end of each connecting rod 2a, 2b being connected to the anchorage points 3a, 3b, and the opposite ends of said connecting rods 2a, 2b being connected to a pantograph-like configuration 5a, 5b, 5c, 5d, comprising rods 5a–5d in a mainly square configuration and comprising hinged connections at the corners. The connecting rods 2a, 2b are articulated connected to opposite corners of the pantograph-like configuration of rods 5a–5d, and two oppositely positioned rods 5a and 5c are connected to the mounting means 6a, 6b by soldering, said soldering being provided on layers of copper on the printed circuit board material. This connection could naturally also be provided by glueing, laser welding, etc. In the construction shown in FIG. 4, the mechanical construction is connected to a strain-transferring construction 9 forming the bottom layer of the layered construction, said strain-transferring construction comprising a copper layer on the top surface at the positions for solder connecting to the anchorage points 3a, 3b for the connecting rods 2a, 2b. The strain-transferring construction 9 is then glued on to the object to be measured on and the strain movement in the object to be measured on is transferred to the mechanical construction through said strain-transferring construction 9. The strain-transferring construction 9 provides a possibility of having a relatively large surface of the measuring system connected to the object to be measured on and still have a relatively short distance between the two anchorage points 3a, 3b, whereby the dynamic range of the fibre-optical strain gauge can be high and the glueing surface for connection to the object to be measured on can be relatively large.

In a preferred embodiment, the connection between the anchorage points 3a, 3b and the strain-transferring construction 9 is provided by means of pins mounted in close fitting holes (see FIGS. 6 and 7) in the two parts and supplemented by a flexible glue, whereby a more precise point-like connection is achieved, providing a well-defined distance between the anchorage points.

Figure 5:
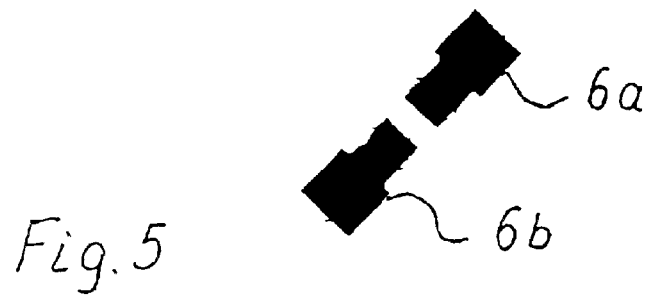
FIG. 5 shows the upper layer of the embodiment in accordance with FIGS. 3 and 4, i.e. the fibre-holding elements.
Figure 6:
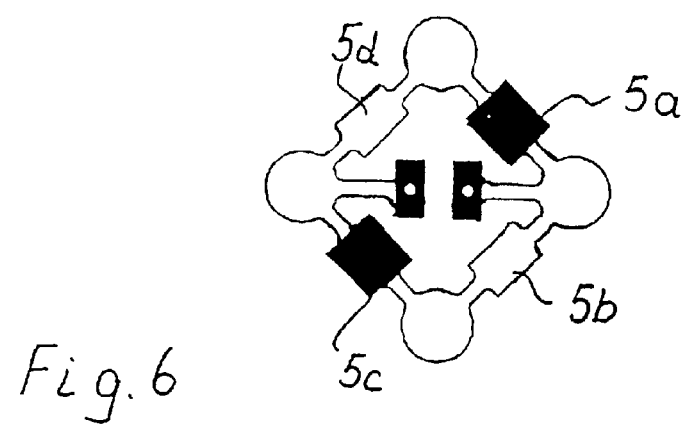
FIG. 6 shows the intermediate layer of the embodiment in accordance with FIGS. 3 and 4, i.e. the transferring and guiding mechanical construction.
Figure 7:
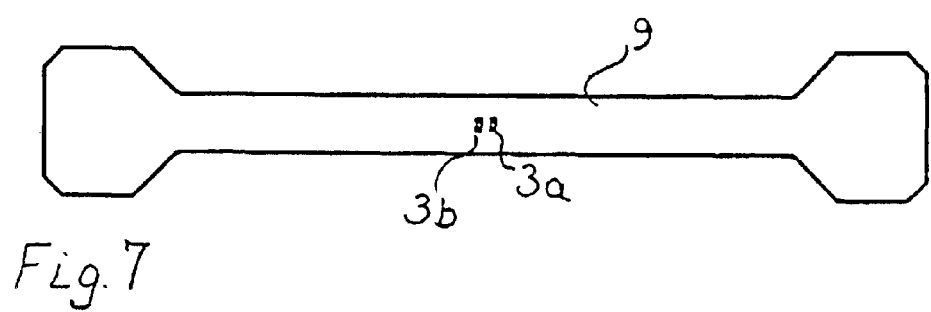

The FIGS. 5, 6 and 7 show each of the three layers of the layered construction shown in FIGS. 3 and 4. Thus, FIG. 5 shows the upper layer of the mechanical construction, i.e. the fibre-holding elements, FIG. 6 shows the intermediate layer, i.e. the connecting rods 2a, 2b, the pantograph-like configuration of rods 5a–5d, and FIG. 7 shows the bottom layer consisting of the strain-transferring construction 9 for mounting on the object to be measured on by glueing.

As can be seen in FIG. 4, the layers of copper and solder or glue provide a certain distance between the printed circuit board mechanical parts, thereby allowing movement of the different layers relative to one another without friction.

Although the invention above has been described with reference to a specific preferred embodiment, it will be evident that many variations may be possible within the scope of the following claims, such modifications e.g. comprising the use of other materials for the mechanical construction including different materials for different components, the use of other mounting techniques for assembling the components, omission of the separate fibre-holding elements 6a, 6b and integrating this function in the mechanical construction, e.g. on the rods 5a, 5c, thereby reducing the number of layers, omission of the strain-transferring construction 9 and mounting of the mechanical construction 1 directly on the object to be measured on, using other metals than copper as basis for soldering/welding, substituting glueing, welding, etc. for the suggested soldering etc.

What is claimed is:

1. Fibre-optical strain gauge comprising a mechanical construction (1) providing a strain-dependent relative movement of oppositely positioned, spaced apart first and second optical fibre ends in a direction substantially perpendicular to the axial direction of the optical fibres (7a, 7b) and using the varying transmission of light between the two fibres (7a, 7b) as an indication of the strain, said mechanical construction comprising fibre-holding elements (6a, 6b) for securing the two fibres (7a, 7b) to the mechanical construction (1) in an aligned relationship in the unstrained condition, characterized by said mechanical construction (1) further comprising a) anchorage means (3a, 3b) for providing two substantially pointy-formed connections between the mechanical construction (1) and the object to be measured on, a line (8) through said two connection points (3a, 3b) defining a strain-measuring direction, b) two connecting rods (2a, 2b), comprising articulated connections at both ends, to the respective anchorage means (3a, 3b) at one end and to respective further parts (5a–5d) of the mechanical construction at the other end, respectively, said two rods (2a, 2b) extending substantially in the strain-measuring direction (8), c) a transmission construction, connected articulated to the rod (2a, 2b) ends opposite the respective anchorage means (3a, 3b), for transferring the movement of said rods (2a, 2b) in said strain-measuring direction (8) to the fibre-holding elements (6a, 6b) and for guiding the movement of said fibre-holding elements (6a, 6b) in a direction substantially perpendicular to said axial direction of said optical fibres (7a, 7b).

2. Fibre-optical strain gauge in accordance with claim 1, characterized by the transmission construction comprising a pantograph-like structure (5a–5d), in which four rods (5a–5d) in a mainly square or parallelogram-formed configuration are mutually connected at the corners via articulated connections and the connecting rods (2a, 2b) being articulated connected close to two oppositely positioned corners of the mainly square configuration, and the fibre-holding elements (6a, 6b) are connected to two oppositely positioned rods (5a, 5c) of said four rods, at or close to the midpoint of said rods (5a, 5b), whereby said pantograph-like configuration provides the transmission and guidance (mentioned under c) in claim 1).

3. Fibre-optical strain gauge in accordance with claim 1 or 2, characterized by the articulated connections being provided in the form of parts of the mechanical construction (1) with reduced cross-section.

4. Fibre-optical strain gauge in accordance with any of the preceding claims, characterized by the mechanical construction (1) being produced in printed circuit board technology using printed circuit board material, such as glass fibre-enforced polyester printed circuit board material.

5. Fibre-optical strain gauge in accordance with claim 4, characterized by the optical fibre-holding elements (6a, 6b) consisting of printed circuit board material, the optical fibres (7a, 7b) being secured to said elements by soldering or glueing and said elements being secured to the mechanical construction by glueing, soldering or welding, copper or other metal layers being formed on said elements for providing basis for the soldering or welding connections.

6. Fibre-optical strain gauge in accordance with claim 4 or 5, characterized by the mounting of the mechanical construction (1) to the object to be measured on being provided by glueing, soldering or welding, copper or other metal layers being formed on said elements for providing basis for said soldering or welding.

7. Fibre-optical strain gauge in accordance with claim 4 or 5, characterized by further comprising a strain-transferring construction (9) of printed circuit board material, said strain-transferring construction (9) extending over a substantial distance in the strain-measuring direction (8) and comprising a copper or other metal layer for connecting to the mechanical construction (1) by soldering, welding or glueing and/or holes for pins extending through the strain-transferring construction (9) and the mechanical construction (1) and a surface opposite the connection to the mechanical construction for connecting to the object to be measured on, said connection preferably being provided by glueing.

8. Fibre-optical strain gauge in accordance with any of the preceding claims, characterized by the coefficient of thermal expansion of the material of the mechanical construction (1, 9) being adapted to the coefficient of thermal expansion of the object to be measured on.

9. Fibre-optical strain gauge in accordance with claim 8, characterized by the coefficients of thermal expansion in the direction of measurement (8) of the mechanical construction (1, 9) and the object to be measured on being mutually adapted (identical).

10. Fibre-optical strain gauge in accordance with any of the claims 4–9, characterized by the object to be measured on being constructed of fibre glass enforced polyester material, e.g. being the wings of a wind turbine.

11. Method of mounting optical fibres (7a, 7b) in a strain gauge in accordance with claim 5, characterized by comprising the steps of a) stripping protective layers from an optical fibre in the area of fixation, b) mounting the stripped fibre in solder and/or glue on the optical fibre-holding elements (6a, 6b) in a prestressed condition, c) after solidification of the solder and/or hardening of the glue, scoring and cleaving the fibre between the fixation points, providing a distance between the resulting fibre ends, said distance being dependent on the pre-stressing of the fibre during mounting.

12. Method in accordance with claim 11, characterized by before step b) further comprising b1) forming a metallized layer on parts of the stripped fibre, at positions corresponding to the positions for mounting to the fibre-holding elements (6a, 6b) by soldering.

* * * * *